Jan. 12, 1965
P. KORDA
3,165,582
AUTOMATIC CONTRAST AND BRILLIANCE CONTROL SYSTEM FOR TELEVISION RECEIVERS
Filed Dec. 29, 1961
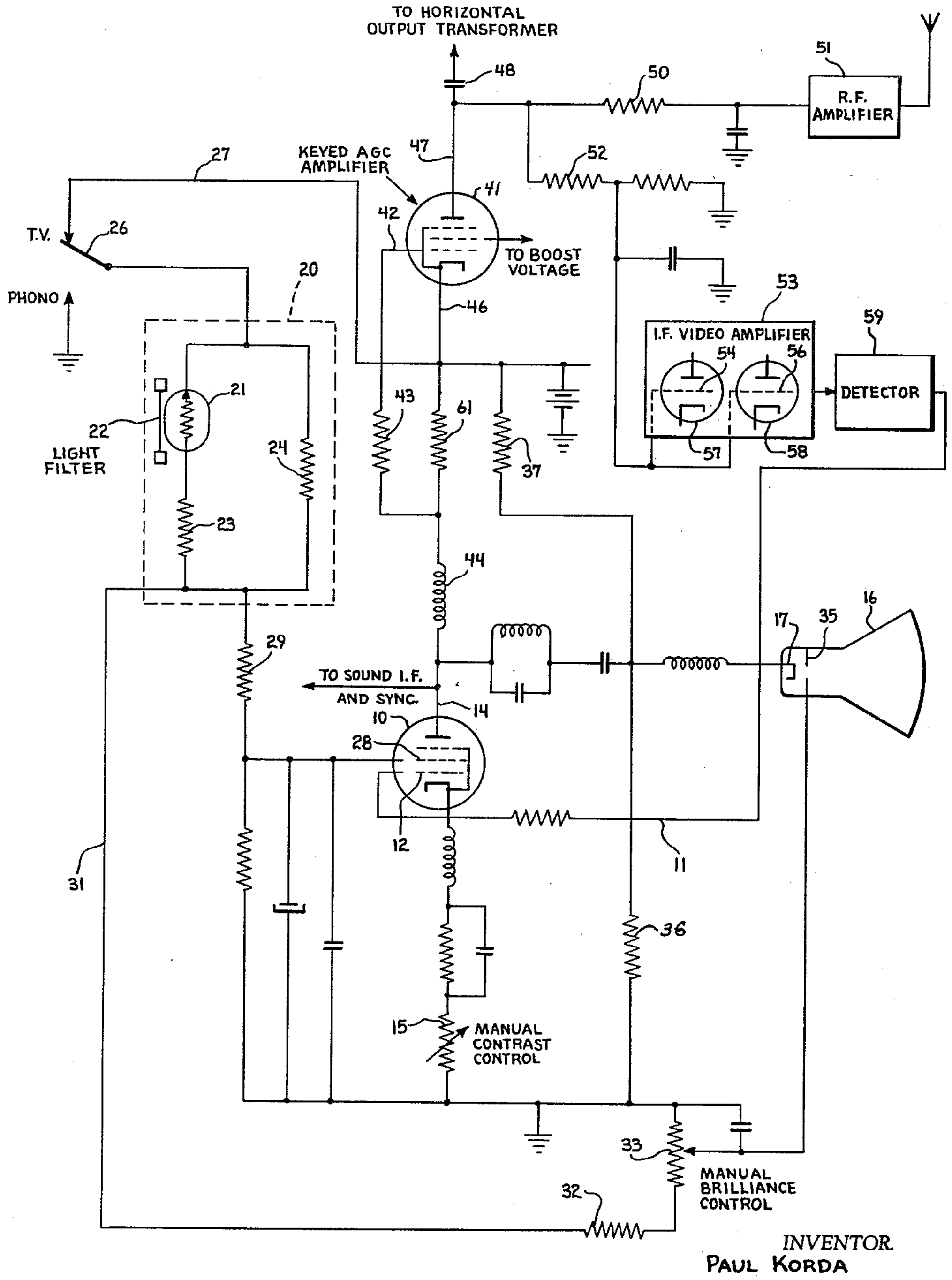
INVENTOR
PAUL KORDA
BY
Lockwood, Woodard, Smith & Weikart
Attorneys 3,165,582
Patented Jan. 12, 1965

3,165,582

AUTOMATIC CONTRAST AND BRILLIANCE CONTROL SYSTEM FOR TELEVISION RECEIVERS

Paul Korda, San Francisco, Calif., assignor to The Magnavox Company, Fort Wayne, Ind., a corporation of Delaware Filed Dec. 29, 1961, Ser. No. 202,036
(Filed under Rule 47(b) and 35 U.S.C. 118)
6 Claims. (Cl. 178—7.5)

This invention relates generally to control systems for television receivers and more particularly it relates to an automatic contrast and brilliance control system responsive to ambient light in the vicinity of a television receiver. This application is a continuation-in-part of my copending application entitled "Automatic Contrast and Brilliance Control System for Television Receivers" bearing Serial No. 97,557 and filed March 22, 1961, now abandoned.

Conventional television receivers include manually operable controls which may be adjusted by the viewer to provide the most desirable level of brilliance and contrast in a received picture. When a television picture is viewed during relatively high intensity ambient light conditions, it is necessary to adjust the brilliance and contrast control to produce a high level of brilliance in the received picture and a relatively high level of contrast between black and white portions of the received picture. When the ambient light level decreases, as is the case during nighttime viewing, it is necessary to change the adjustments of the brilliance and contrast controls to reduce the over-all brilliance of the received picture and likewise, it is necessary to reduce the contrast.

It has been suggested in the prior art that automatic means be provided for adjusting brilliance and contrast of television pictures, but the apparatus of the prior art has required not only a conventional photoelectric signal generating circuit, but also additional amplifying, filtering and time constant circuits which needlessly increase the complexity and cost of television receivers.

The principal object of this invention is to provide in a television receiver circuit a simple, inexpensive and efficient means adapted automatically to adjust brilliance and contrast of the reproduced picture in accordance with ambient light conditions in the vicinity of the receiver.

Another object of this invention is to provide a light sensitive circuit adapted to be connected directly to a video amplifier and a control electrode of a picture reproducing tube for automatically controlling brilliance and contrast of a reproduced picture.

Still another object of this invention is to provide an automatic contrast and brilliance control system for television receivers wherein a properly balanced relationship exists between contrast and brilliance under all ambient light conditions.

In accordance with this invention there is provided in a television receiver a resistive light sensitive means which may be coupled to a control electrode of a conventional video amplifier combined with a keyed AGC circuit, and coupled also to a control electrode of the picture reproducing tube for automatically and simultaneously controlling contrast and brilliance of a reproduced picture.

The full nature of the invention will be understood from the accompanying drawings and the following description and claims.

The drawing is a circuit diagram illustrating the video signal portion of a conventional television receiver but including automatic contrast and brilliance control means as provided in accordance with this invention.

Referring to the drawing, a portion of a conventional television receiver is illustrated, the synchronizing circuits, the demodulation circuits, the intermediate frequency circuits, and the sound amplifying circuits being omitted for purposes of simplifying the disclosure of this invention. A screen grid type of video amplifier tube 10 is coupled to the detector circuit of a conventional receiver by means of the line 11 whereby the control grid 12 of tube 10 may be energized to cause amplified picture signals to appear in the anode circuit 14. The cathode circuit of tube 10 includes a manual contrast control 15. A conventional cathode ray picture tube 16 includes a control electrode 17 coupled in conventional fashion to anode circuit 14 whereby the cathode ray of tube 16 may be controlled to create a reproduced picture on the screen of tube 16.

There is provided in accordance with this invention a light sensitive circuit 20 for providing brilliance and contrast control signals in response to changes of ambient light conditions in the vicinity of the television receiver. The circuit 20 comprises a first leg having a simple cadmium sulphide cell 21, the resistance of which varies in response to changes of light impinging thereon. A red filter 22 may be located by any suitable means in the path of light impinging on cell 21. The characteristics of the red filter 22 are such that the effective range of response of cell 21 is extended to a degree such that it will generate signals representative of a wide range of light variation. For example, a television receiver may be located in a room which receives brilliant sunlight, and under these conditions the cell 21 responds to the extremely brilliant light level which occurs under such conditions. In the absence of filter 22, cell 21 would have an adequate level of response except when extremely brilliant light conditions occur. A resistor 23 is connected in series with cell 21 and the other leg of circuit 20 includes resistor 24.

The light sensitive circuit 20 is connected at one end through a switch 26 to the high voltage line 27 and at the other end to the screen grid 28 of tube 10 through a resistor 29. Switch 26 is provided for the purpose of cutting off the sound and vision circuits and the picture tube of the television receiver when it is desired to connect a record player to the loud-speaker circuit.

Light sensitive circuit 20 is also coupled through line 31, resistor 32, and manual brilliance control potentiometer 33 to the control electrode 35 of cathode ray tube 16. Thus, signals generated in circuit 20 are simultaneously impressed on screen grid 28 of tube 10 and the control electrode 35 of cathode ray tube 16.

The keyed AGC circuit may employ the pentode section 41 of a 6GH8 tube, and components are chosen so control will be maintained over an extreme range of input signal strength. The control grid 42 is D.C. coupled through resistor 43 and coil 44 to the anode circuit 14 of the video amplifier placing B+ on the grid of the tube 41. The cathode 46 is returned to the high voltage line 27. Under normal conditions the positive potential at the cathode will be greater than that at the grid thus biasing the tube well below cut-off. The signal which appears at the control grid is a sync-positive composite video signal. Components are chosen so only the sync pulses on this signal are sufficient to drive the grid out of cut-off. The instant the sync pulse appears on the grid, the anode 47, which is coupled through capacitor 48 to a tap on the horizontal output transformer (not shown), is driven positive by the pulse obtained from the horizontal output transformer allowing the tube to conduct. Since the tube can only conduct when its anode is positive, any noise pulses which may occur between sync pulses cannot cause the tube to conduct. Therefore, the noise pulses will have no effect on the AGC voltage.

The AGC voltage on the anode of the keyed AGC amplifier tube 41 is coupled through resistor 50 to the grid of the R.F. amplifier tube (not shown) in the R.F. amplifier stage 51 of the receiver. The AGC voltage is also coupled through resistor 52 to the I.F. video amplifier 53 of the television receiver. Normally the coupling is made to the control grids 54 and 56 of I.F. video amplifier tubes, 57 and 58, as indicated schematically. The AGC controlled output of the amplifier 53 is coupled to detector 59 of the television receiver. The detector provides the video on line 11, which is coupled to the control grid 12 of video amplifier 10.

The circuit components which appear in the drawing and have not been described in detail are conventional coupling and biasing elements, and the like, which are well known to those skilled in the art and, therefore, further detailed description is unnecessary.

In operation, changes of ambient light conditions in the vicinity of the television receiver, cause changes in the value of resistance of the light dependent or responsive resistor 21. This causes the D.C. voltage on the screen grid 28 of the video amplifier tube 10 to change. The D.C. plate current of the video amplifier changes accordingly (lower screen voltage gives lower plate current), and the voltage across resistor is therefore changed.

Inasmuch as resistor 61 is located across the AGC amplifier grid to cathode, gain of the AGC amplifier tube 41 is controlled by the voltage across resistor 61. Decrease of the voltage increases gain of the tube and causes more AGC voltage to appear in the AGC tube plate circuit. The increased AGC voltage coupled to the control grids of I.F. video amplifier tubes reduces the gain of I.F. video amplifier. Being coupled to the grid of the R.F. amplifier tube, it also reduces the gain thereof. Therefore, less video signal is applied by detector 59 to the control grid 12 of video amplifier tube 10. The amplifier video output of the tube 10 on element 14 is correspondingly decreased. Thus the picture contrast is decreased by a lower voltage on screen 28 of the video amplifier video output of the tube 10 on element 14 is sponse of resistor 21 to lower ambient light intensities. Higher light intensities, of course, reverse the result and provide greater picture contrast.

The resistor 24 may have a value selected to limit what may be termed the "dark resistance" of the screen grid network, "dark resistance" being the effective resistance of network 20 under dark or relatively low ambient light conditions. Resistor 23 may be selected to have a value adapted to limit what may be termed the "light resistance" of the screen grid circuit, "light resistance" being the effective resistance of network 20 under high intensity ambient light conditions. Decreasing the value of resistor 24 has the effect of decreasing the range of contrast control, while increasing the value of this resistor has the opposite effect of increasing the range of contrast control. The value of this resistor likewise controls the range of brilliance control.

In summary of the contrast control aspect of the invention, changes of ambient light change the D.C. screen voltage of the video amplifier tube. The AGC voltage is therefore changed to change the video input to the grid of the video amplifier. The amplified video output to the cathode ray tube is changed accordingly. The effectiveness of control of contrast by the method of this invention is largely attributable to the fact that changing the D.C. screen voltage on the video amplifier changes the D.C. voltage gain much faster than the A.C. voltage gain.

Turning now to operation of the brilliance control, as previously described, line 31 serves to impress voltage changes occurring in the light sensitive circuit 20 on the control electrode 35 of the cathode ray tube. As the ambient light impinging on cell 21 decreases, the voltage impressed on line 31 also decreases. This has the effect of providing an increasing bias to the picture tube, since the picture tube cathode 17 is connected to a positive bias point which is fed through a divider network 36, 37 which adjusts the standing direct current potential on the cathode to approximately 100 volts, for example. The value of this standing bias voltage determines the tracking characteristics of the brilliance control, since it determines the value of the series resistor 32 of manual brilliance control potentiometer 33. These two components in turn act as a voltage divider network for the voltage available on line 31 and provide the required range of voltage on grid 35 of the cathode ray tube.

From the foregoing description it will be apparent that this invention provides a simplified and inexpensive system for simultaneously and automatically controlling contrast and brilliance in a television receiver. No additional amplifier tubes or filters or other circuit components have been utilized, and the simple light sensitive circuit has been connected directly to the video amplifier and cathode ray tube as these elements appear in a conventional television receiver.

The invention claimed is:

1. A television receiver comprising a cathode ray tube including first and second control electrodes, a picture signal amplifier tube coupled to one of said control electrodes for impressing picture signals thereon, said amplifier tube including a video signal control electrode and a second control electrode, light sensitive means responsive to ambient light conditions in the vicinity of said cathode ray tube for generating signals representative of said ambient light conditions, means coupling said light sensitive means to the other of the control eletcrodes of said cathode ray tubes for impressing said ambient light representative signals thereon to vary the brilliance of the image on said cathode ray tube, and means for coupling said light sensitive means to the second control electrode of said amplifier tube for impressing said ambient light representative signals thereon to vary the contrast effects of said image.

2. The television receiver of claim 1 wherein said light sensitive means includes a red filter positioned to reduce the available light impinging on said light sensitive means thereby to increase the control range of said light sensitive means to include extremely high levels of ambient light.

3. A television receiver comprising a cathode ray tube having first and second control electrodes, a picture signal channel coupled to one of said control electrodes for impressing picture signals thereon, light sensitive means responsive to ambient light conditions in the vicinity of said cathode ray tube for generating signals representative of said ambient light conditions, means for coupling said light sensitive means to the other of said control electrodes of said cathode ray tube and to said picture signal channel for impressing ambient light representative signals on said other control electrode for simultaneously varying contrast effects and brilliance of said image, and means for adjusting the bias on one of said cathode ray tube electrodes for determining the tracking relationship for brilliance and contrast under all ambient light conditions.

4. A television receiver comprising a cathode ray tube including a control electrode and a grid electrode, a picture signal amplifier tube coupled to said control electrode for impressing picture signals thereon, said amplifier tube including an anode and a control grid and a screen grid, an automatic gain control means including an amplifier tube coupled to the anode of said signal amplifier for varying the gain of said gain control amplifier tube according to the anode current of said signal amplifier, an intermediate frequency amplifier coupled to said automatic gain control means for control of the gain of said intermediate frequency amplifier by said gain control means, a detector having an input coupled to said intermediate frequency amplifier and an output coupled to the control grid of said picture signal amplifier tube, light sensitive means responsive to ambient light conditions for generating signals representative of said ambient light conditions, means coupling said light sensitive means to said grid electrode for impressing said ambient light representative signals thereon to vary the bias voltage on said grid electrode and the brightness of the image on said cathode ray tube, and means for coupling said light sensitive means to said screen grid for impressing said ambient light representative signals thereon to vary the contrast effects of said image.

5. A television receiver comprising a cathode ray tube including a control electrode and a grid electrode, a picture signal amplifier tube coupled to said control electrode for impressing picture signals thereon, said amplifier tube including an anode and a control grid and a screen grid, an automatic gain control means including an amplifier tube coupled to the anode of said signal amplifier for varying the gain of said gain control amplifier tube according to the anode current of said signal amplifier, an intermediate frequency amplifier coupled to said automatic gain control means for control of the gain of said intermediate frequency amplifier by said gain control means, a detector having an input coupled to said intermediate frequency amplifier and an output coupled to the control grid of said picture signal amplifer tube, light sensitive means responsive to ambient light conditions for generating signals representative of said ambient light conditions, and means for coupling said light sensitive means to said screen grid for impressing said ambient light representative signals thereon to vary the contrast effects of the image on said cathode ray tube.

6. A television receiver comprising a cathode ray tube including first and second control electrodes, a picture signal amplifier tube coupled to one of said electrodes for impressing picture signals thereon, said amplifier tube including a video signal control electrode and a second control electrode, an automatic gain control means having an amplifier coupled to said picture signal amplifier tube for producing a gain control signal having a value changeable according to the level of voltage on said second control electrode, amplifier and detector means coupled to said gain control means and to said video signal control electrode, light sensitive means responsive to ambient light conditions for generating signals representative of said ambient light conditions, and means coupling said light sensitive means to said second control electrode of said picture signal amplifier tube for impressing said ambient light representative signals thereon to change the contrast effects of the image on said cathode ray tube according to ambient light conditions.

References Cited by the Examiner

UNITED STATES PATENTS 2,567,713 9/51 Kaplan ---------- 178—7.8 XR

FOREIGN PATENTS 1,223,058 6/60 France.

DAVID G. REDINBAUGH, *Primary Examiner.*